United States Patent
Zhang et al.

(10) Patent No.: US 8,463,120 B2
(45) Date of Patent: Jun. 11, 2013

(54) METHOD, SYSTEM AND NODE DEVICE FOR REALIZING SERVICE PROTECTION IN AUTOMATICALLY SWITCHED OPTICAL NETWORK

(75) Inventors: Fatai Zhang, Shenzhen (CN); Huiying Xu, Shenzhen (CN); Yongliang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 900 days.

(21) Appl. No.: 12/240,361

(22) Filed: Sep. 29, 2008

(65) Prior Publication Data
US 2009/0028561 A1    Jan. 29, 2009

Related U.S. Application Data

(63) Continuation of application No. PCT/CN2007/000727, filed on Mar. 7, 2007.

(30) Foreign Application Priority Data

Jul. 3, 2006  (CN) .......................... 2006 1 0061488

(51) Int. Cl.
    *H04B 10/00*    (2006.01)
(52) U.S. Cl.
    USPC ............................. 398/5; 398/1; 398/6; 398/7
(58) Field of Classification Search
    USPC .......................................................... 398/1–8
    See application file for complete search history.

(56) References Cited

U.S. PATENT DOCUMENTS

| 6,195,704 B1 | 2/2001 | Suita |
| 6,438,286 B1 | 8/2002 | Duerksen et al. |
| 6,848,062 B1 * | 1/2005 | Desai et al. .................... 714/4.1 |

(Continued)

FOREIGN PATENT DOCUMENTS

| CN | 1208526 A | 2/1999 |
| CN | 1499747 A | 5/2004 |

OTHER PUBLICATIONS

Lang et al., "RSVP-TE Extensions in support of End-to-End Generalized Multi-Protocol Label Switching (GMPLS)-based Recovery," CCAMP GMPLS P&R Design Team, Apr. 2005, Internet Society, Reston, Virginia.

(Continued)

*Primary Examiner* — Agustin Bello
(74) *Attorney, Agent, or Firm* — Leydig, Voit & Mayer, Ltd.

(57) ABSTRACT

A method for realizing service protection in the automatically switched optical network includes following steps: after any defect occurs on the working paths that carry the service, the first node and the last node of the working paths sends the requests to restore the paths setup in opposite directions, respectively; at least one intermediate node in the restoration path establishes a connection according to the restoration path setup request, and forwards the restoration path setup request hop by hop, until the setup of the recovering path is finished; the service is switched from the working paths to the restoration paths. A system for realizing service protection and a node device in an ASON is also provided. The paths restoration process can be faster obviously using this invention, and the restoration time can be shortened, and the work efficiency and reliability can be improved, and the service can be ensured to be restored.

8 Claims, 5 Drawing Sheets

U.S. PATENT DOCUMENTS

| | | | | |
|---|---|---|---|---|
| 6,985,959 | B1* | 1/2006 | Lee | 709/238 |
| 7,039,005 | B2* | 5/2006 | Jenq et al. | 370/217 |
| 7,269,346 | B1* | 9/2007 | Iyer et al. | 398/3 |
| 7,289,429 | B2* | 10/2007 | Mo et al. | 370/217 |
| 7,315,693 | B2* | 1/2008 | Ovadia et al. | 398/57 |
| 7,324,750 | B2* | 1/2008 | Badt, Jr. | 398/1 |
| 7,340,169 | B2* | 3/2008 | Ovadia et al. | 398/57 |
| 7,483,399 | B2* | 1/2009 | Zelig et al. | 370/258 |
| 7,496,105 | B2* | 2/2009 | Vasseur et al. | 370/401 |
| 7,558,276 | B2* | 7/2009 | Vasseur et al. | 370/401 |
| 7,596,313 | B1* | 9/2009 | Iyer et al. | 398/5 |
| 7,602,702 | B1* | 10/2009 | Aggarwal | 370/217 |
| 7,626,925 | B1* | 12/2009 | Sivabalan et al. | 370/228 |
| 7,652,983 | B1* | 1/2010 | Li et al. | 370/217 |
| 7,680,028 | B1* | 3/2010 | Zamfir et al. | 370/216 |
| 7,680,029 | B2* | 3/2010 | Kano et al. | 370/218 |
| 7,733,788 | B1* | 6/2010 | Michalski et al. | 370/242 |
| 7,852,752 | B2* | 12/2010 | Kano | 370/221 |
| 7,852,758 | B2* | 12/2010 | Kataoka et al. | 370/230 |
| 7,974,183 | B2* | 7/2011 | Li et al. | 370/217 |
| 2003/0063613 | A1* | 4/2003 | Carpini et al. | 370/401 |
| 2003/0189920 | A1* | 10/2003 | Erami et al. | 370/351 |
| 2004/0264960 | A1* | 12/2004 | Maciocco et al. | 398/49 |
| 2005/0180316 | A1 | 8/2005 | Chan | |
| 2006/0083251 | A1* | 4/2006 | Kataoka et al. | 370/400 |
| 2009/0028561 | A1* | 1/2009 | Zhang et al. | 398/45 |

OTHER PUBLICATIONS

"TD 212Revised (PLEN/15)—Draft revised Recommendation G.8080/Y.1304 (For Consent)," Telecommunication Standardization Sector Study Period 2005-2008, Feb. 6-17, 2006, International Telecommunication Union, Geneva, Switzerland.

"Architecture for the Automatic Switched Optical Networks (ASON); G.8080/Y.1304," *International Telecommunication Union*, 1-106 (Jun. 2006).

Braden et al., "RFC 2209—Resource ReSerVation Protocol (RSVP)—Version 1 Message Processing Rules," Sep. 1997, Internet Engineer Task Force, Fremont, California.

Berger et al., "RFC 3471—Generalized Multi-Protocol Label Switching (GMPLS) Signaling Functional Description," Jan. 2003, The Internet Society, Reston, Virginia.

Berger et al., "RFC 3473—Generalized Multi-Protocol Label Switching (GMPLS) Signaling Resource ReserVation Protocol-Traffic Engineering (RSVP-TE) Extensions," Jan. 2003, The Internet Society, Reston, Virginia.

Mannie et al., "RFC 3945—Generalized Multi-Protocol Label Switching (GMPLS) Architecture," Oct. 2004, The Internet Society, Reston, Virginia.

Written Opinion of the International Searching Authority in corresponding International Patent Application No. PCT/CN2007/000727 (Jun. 21, 2007).

* cited by examiner

METHOD, SYSTEM AND NODE DEVICE FOR REALIZING SERVICE PROTECTION IN AUTOMATICALLY SWITCHED OPTICAL NETWORK

CROSS-REFERENCE TO RELATED APPLICATION

This application is a continuation of International Patent Application No. PCT/CN2007/000727, filed Mar. 7, 2007, which claims priority to Chinese Patent Application No. 200610061488.4, filed Jul. 3, 2006, both of which are hereby incorporated by reference in their entirety.

FIELD OF THE INVENTION

The present invention relates to the field of network communication technology, and, in particular, to a method, system, and node device for realizing service protection in an Automatically Switched Optical Network (ASON).

BACKGROUND OF THE INVENTION

In conventional optical network technology field, such as Synchronous Digital Hierarchy (SDH), Synchronous Optical Network (SONET) and Optical Transmission Network (OTN), the network is mainly constructed in the form of a Self-Healing Ring, of which the drawback lies in the relatively low bandwidth utilization ratio. Furthermore, static configuration made by network manager is often adopted in the conventional optical network technology, which is relatively complicated and has large consumption of time. With the emergence of various requirements of multi-service, high bandwidth, high survivability, and fast provision of connection, the existing network architecture and networking mode are strongly impacted, and therefore the network topology will evolve from the conventional ring network to the Mesh Network. Accordingly, the network connection provision mode will also have a transition from the permanent connection provisioned statically to the signaling-based Soft Permanent Connection (SPC) and Switch Connection (SC), which become a core technology in the development of optical network. Therefore, this new type of optical transmission network is named as ASON by the International Telecommunication Union—Telecommunication Standardization Sector (ITU-T), in which the concept of "control plane" is introduced for the establishment, modification, and maintenance of the network connection, and for the restoration of the connection under the condition of network failure. In addition, implementation of ASON signaling includes the Generalized Multi-Protocol Label Switching (GMPLS) protocol developed by Internet Engineering Task Force (IETF).

Figure 1:
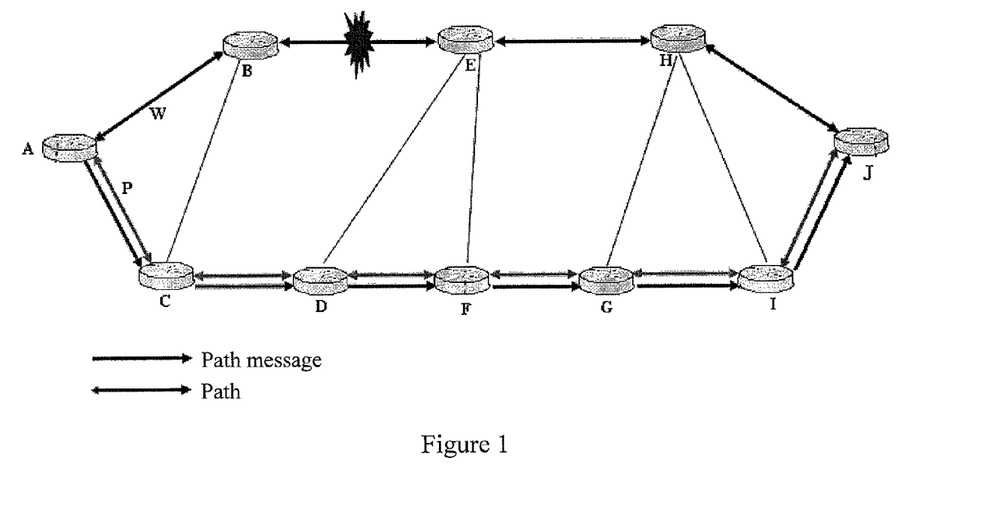
FIG. 1 is a schematic diagram illustrating the establishment of a restoration path.

In a Mesh network, restoration mechanisms that are currently used include: restoration path pre-calculation, restoration path resource reservation, restoration path resource pre-selection, and dynamic re-routing. With respect to the problem concerning how to restore the service when failure occurs in a working path with the above various restoration mechanisms, currently the research emphases is focused on the approach that a first node initiates a signaling unidirectionally to establish a restoration path, and then the service is switched from the failed path to the restoration path. The main process is as follows: as shown in FIG. 1, assuming that node A is the first node, when detecting the occurrence of failure in this path, node B in the working path W (A→B→E→H→J) notifies information of failure status to the node A in the working path, and then node A takes charge of the establishment of the restoration path, i.e. node A creates a signaling message first, and then the connection of each node in the restoration path is established hop by hop in a direction from node A to node J with information of restoration path carried, until the entire restoration path is completed, and finally the service is switched from the failed path to the restoration path P (A→C→D→F→G→I→J), so that the service is restored. The signaling messages created include: resource reservation setup protocol with traffic-engineering extensions (RSVP-TE) and Constrained Route-Label Distribution Protocol (CR-LDP).

In this restoration mechanism, the distributed characteristic in the ASON is not exerted sufficiently. The signaling is only initiated in a single direction (first node→end node) when establishing a restoration path, which results in a long time for establishing a restoration path, and a low implementation efficiency, whereby the transmission of service is affected or even interrupted.

SUMMARY OF THE INVENTION

An embodiment of the invention provides a method, system, and node device for realizing service protection in an ASON to shorten the time for establishing a restoration path and therefore assure the service to be restored.

A method for realizing service protection in an ASON network, the network including a first node and an end node in a working path and at least one intermediate node in a restoration path, includes: initiating a restoration path setup request oppositely by the first node and the end node in the working path, respectively, when a failure occurs in the working path where a service is provided; establishing a connection by an intermediate node in the restoration path according to the restoration path setup request, and forwarding the restoration path setup request hop by hop until the establishing of the restoration path is completed; and switching the service from the working path to the restoration path.

A system for realizing service protection in an ASON includes a first node and an end node in a working path, and at least one intermediate node in a restoration path.

Both the first node and the end node include: a failure information obtaining unit adapted to obtain failure information in the working path; and a working path switching unit adapted to switch the service from the working path to the restoration path after the establishment of restoration path is completed.

The first node further includes: a first restoration path setup unit adapted to initiate a restoration path setup request in the direction toward the end node along the restoration path.

The end node further includes: a second restoration path setup unit adapted to initiate a restoration path setup request in the direction toward the first node along the restoration path. The intermediate node in the restoration path includes: a message receiving unit adapted to receive the restoration path setup request; a connection setup unit adapted to establish a connection according to the restoration path setup request; and a message forwarding unit adapted to forward the restoration path setup request hop by hop until the establishment of the restoration path is completed.

A node device in an ASON includes: a message receiving unit adapted to receive restoration path setup requests initiated oppositely by a first node and an end node in a working path, respectively; a signaling status detecting unit adapted to detect information of signaling status after the restoration path setup request is received by the message receiving unit, the information of signaling status including: whether a restoration path setup request from the opposite node is received, and whether a connection through this node has been established, according to the restoration path setup request from the opposite node; a connection setup unit adapted to establish a connection according to the detection result from the signaling status detecting unit; and a message forwarding unit adapted to forward the restoration path setup request hop by hop until the establishment of the restoration path is completed.

In the embodiment of the invention, the first node and end node in the working path initiate the establishment of the restoration path, i.e. the first node creates a forward signaling message in the form of standard signaling, and the end node creates a reverse signaling message in the form of extended signaling. Then, the first node and end node initiate oppositely the restoration path setup request carrying the signaling message. The node in the restoration path establishes a connection through this node, according to the received request, until the current node has received the forward and reverse signaling messages and completes the connection setup, so that the establishment of the entire restoration path is completed. Apparently, this may accelerate the process of path restoration and shorten the time for restoration significantly, and therefore the work execution efficiency and reliability are improved.

BRIEF DESCRIPTION OF THE DRAWINGS

The drawings described here are provided for further understanding of the invention, which are considered as a part of the invention and do not limit the invention, in which.

DETAILED DESCRIPTION OF THE EMBODIMENTS

For making the objects, technical solutions, and advantages of embodiments of the invention more clear, the embodiment of the invention will be further described in detail with reference to embodiments and drawings. Here, the embodiments of the invention and the illustration thereof are adapted to interpret the invention and not limit the invention.

Next, the invention will be further described in detail in conjunction with the drawings and embodiments.

According to the present invention, in an ASON, when detecting the occurrence of a failure in a working path, the node in the working path notifies information of failure status to a first node and an end node in the working path. The first node creates a forward signaling message in the form of standard signaling, and the end node creates a reverse signaling message in the form of extended signaling. Then, the first node and the end node initiate oppositely a restoration path setup request carrying the signaling message. The node in a restoration path establishes a connection through this node, according to the received request, until the current node has received the forward and reverse signaling messages and completes the connection setup, so that the establishment of the entire restoration path is completed.

Figure 2:
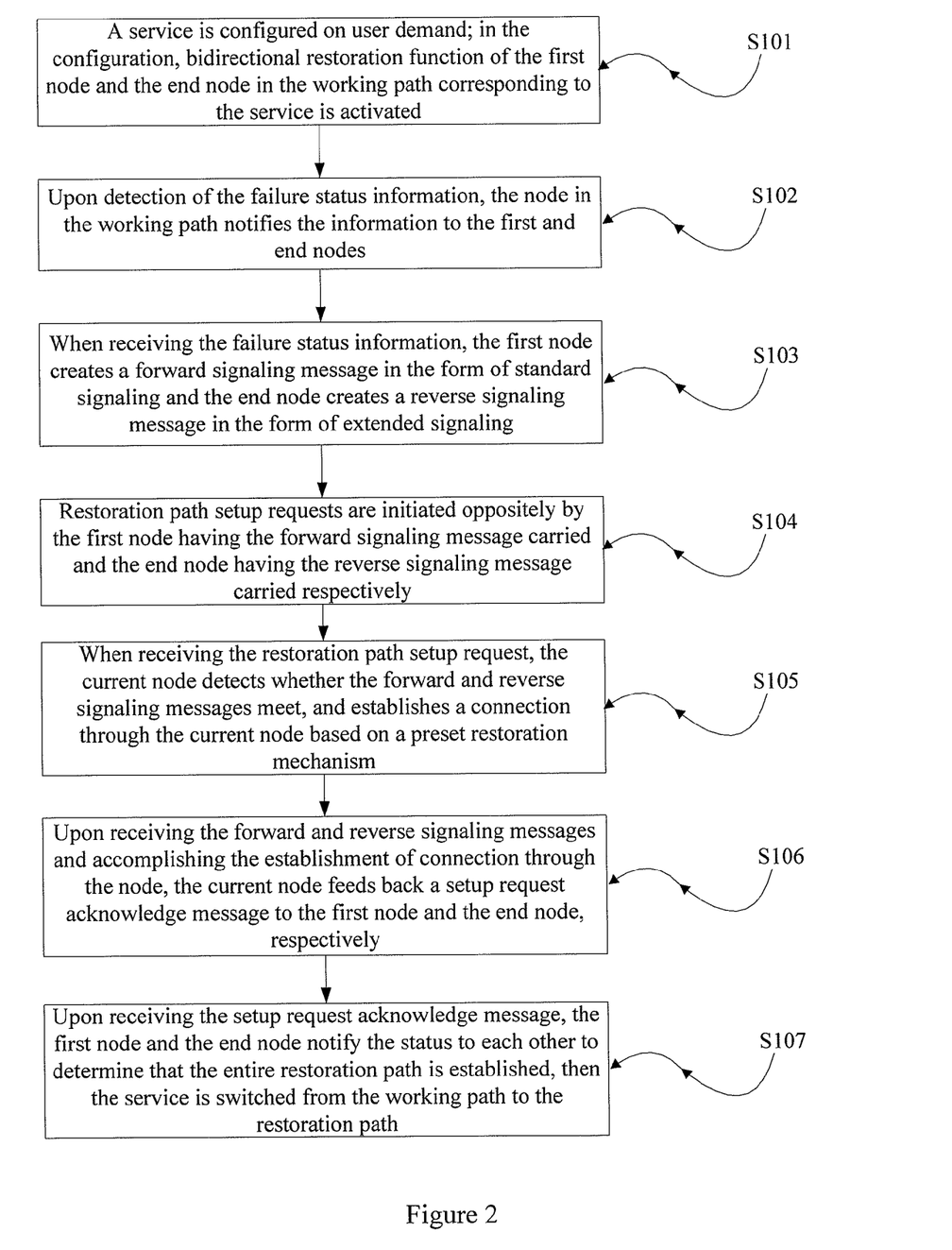
FIG. 2 is a flowchart for implementing service protection, according to an embodiment of the invention.

FIG. 2 is a flowchart for implementing service protection, according to an embodiment of the invention, which includes:

S101: A service is configured as required by a user; in the configuration, bidirectional restoration function of the first node and the end node in the working path corresponding to the service is activated. A signaling is initiated to establish a working path, and information of the nodes that the restoration path corresponding to the working path passes through is determined by a control plane and saved.

Figure 3:
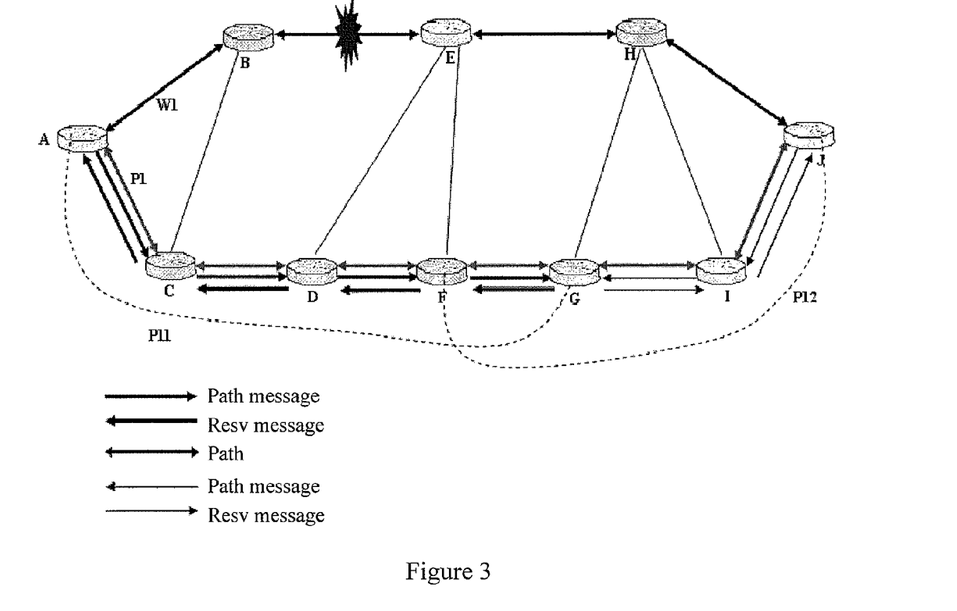
FIG. 3 is a schematic diagram illustrating the establishment of a restoration path, according to an embodiment of the invention.

As shown in FIG. 3, assuming that the working path of a current service is W1 and the protection path is P1. The first node and end node in the working path of the service is configured by the network manager firstly, and the "bidirectional restoration" function of the two nodes is activated. So-called "bidirectional restoration" function means that the first node and end node in the working path may initiate signaling oppositely to establish the restoration path.

In the embodiment, in order to keep compatibility with existing protocols to make the node device that supports the existing protocols compatible with the node device that supports the method of the present invention, a parameter of bidirectional restoration function may be provided, through which the bidirectional restoration function of the first node and end node in the working path corresponding to the service may be activated or deactivated. When the bidirectional restoration function is activated, the first node and end node use the bidirectional restoration function provided by the invention to establish a restoration path; and when the bidirectional restoration function is deactivated, the first node and end node may use the unidirectional restoration function in the prior art to establish a restoration path.

The invention is not limited to those described above. In some applications, for example, in the case that all the node devices in the network support the method of the invention, it is possible to set the bidirectional restoration described in the invention as the default restoration mode, i.e. the above parameter of bidirectional restoration function is not to be set.

S102: When a failure occurs in the working path, a node in the working path detects the current failure status information and notifies the information to the first node and end node in the working path.

As shown in FIG. 3, there is a failure in the working path W1 (A→B→E→H→J), and both node B and node E detect this failure. Node B notifies the first node (node A) in W1 of the detected failure information, and node E notifies the end node (node J) in W1 of the detected failure information.

S103: When receiving the failure status information, the first node and end node start the process of "bidirectional restoration" for the protection path. The first node creates a forward signaling message in the form of standard signaling, and the end node creates a reverse signaling message in the form of extended signaling.

It should be noted that, as shown in FIG. 3, so-called forward signaling message is a message for establishing the restoration path P1 (A→C→D→F→G→I→J) in the direction from the first node (node A) to the end node (node J), and so-called reverse signaling message is a message for establishing the restoration path in the direction from the end node (node J) to the first node (node A).

In the forward signaling message created by the first node, a bidirectional restoration flag bit may be provided which represents that an approach of "bidirectional restoration" is being used currently to establish the restoration path. A bidirectional restoration flag bit may be provided in the reverse signaling message created by the end node, and a new extended object may be further carried in the reverse signaling message, which represents that "the end node initiates the establishment of restoration path." Other objects in the reverse signaling message are identical to that in the forward signaling message.

In the embodiment of the invention, RSVP-TE signaling message or CR-LDP signaling message of GMPLS may be used to realize the entire process of establishment of the restoration path, as shown in FIG. 3, taking the RSVP-TE signaling message for example to describe the specific implementation process.

As a supplement protocol for the RSVP protocol, the RSVP-TE is adapted to establish a Label Switch Path (LSP) in the Multi-Protocol Label Switching (MPLS) network. This extended RSVP protocol is mainly used for supporting the explicit transmission of a LSP instance in either the case that resources are reserved or not, and the LSP connection is established mainly by using a Path message and a Resv message. In particular, the Path message is transmitted in the direction from a source node (upstream node) to a destination node (downstream node) and a Path Status Block (PSB) is created in an intermediate node the Path message passed through. The Resv message is transmitted along the reverse path that is opposite to the direction from a source node (upstream node) to a destination node (downstream node), i.e. from the downstream node to the upstream node, carrying reservation information to create Resv Status Block (RSB) hop by hop along this path from a receiver to a transmitter. The Resv message is triggered when the Path message arrives to the destination node. Usually, in ASON, the Path message establishes reverse cross-connections and the Resv message establishes forward cross-connections, whereby the establishment of entire bidirectional LSP connection is completed. Some objects may be carried in the Path message, such as:

```
<Path Message> ::=    <Common Header> [ <INTEGRITY>
    [ [<MESSAGE_ID_ACK> |
<MESSAGE_ID_NACK>] ... ]
    [ <MESSAGE_ID> ]
    <SESSION> <RSVP_HOP>
    <TIME_VALUES>
    [ <EXPLICIT_ROUTE> ]
    <LABEL_REQUEST>
    [ <PROTECTION> ]
    [ <LABEL_SET> ... ]
    [ <SESSION_ATTRIBUTE> ]
    [ <NOTIFY_REQUEST> ]
```

-continued

```
    [ <ADMIN_STATUS> ]
    [ <POLICY_DATA> ... ]
    <sender descriptor>
```

Also some objects may be carried in the Resv message, such as:

```
<Resv Message> ::=    <Common Header> [ <INTEGRITY> ]
    [ [<MESSAGE_ID_ACK> |
<MESSAGE_ID_NACK>] ... ]
    [ <MESSAGE_ID> ]
    <SESSION> <RSVP_HOP>
    <TIME_VALUES>
    [ <RESV_CONFIRM> ] [ <SCOPE> ]
    [ <NOTIFY_REQUEST> ]
    [ <ADMIN_STATUS> ]
    [ <POLICY_DATA> ... ]
    <STYLE> <flow descriptor list>
```

When a failure occurs in the working path, information of failure status is notified to the first node (node A) and the end node (node J) in the working path. After receiving the information of failure status, the first node (node A) creates a forward signaling message immediately in the form of standard signaling. A bidirectional restoration flag bit is provided in the forward signaling message, i.e. a B bit is provided in the existing Admin Status object and the B bit is set to be 1. And when receiving the information of failure status, the end node (node J) creates a reverse signaling message immediately in the form of extended signaling. A bidirectional flag bit and an extended object are provided in the reverse signaling message, i.e. a B bit is provided in the existing Admin Status object and the B bit is set to be 1, as the case in the forward signaling message.

Figure 4:
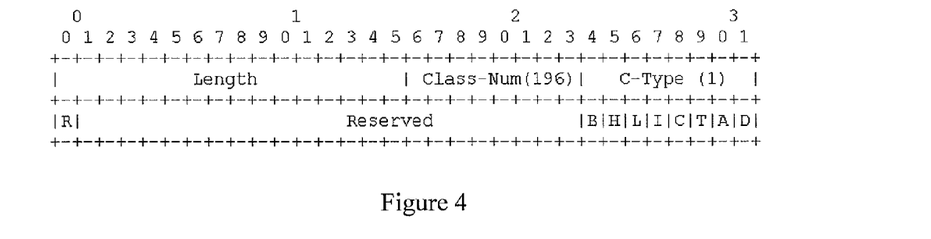
FIG. 4 is a schematic diagram illustrating structure of Admin Status object of a forward signaling message, according to an embodiment of the invention.

FIG. 4 is a schematic structural diagram of the Admin Status object.

As shown in FIG. 4, the contents include: Length represents a length of object in bytes; Class-Num represents a class number; C-Type represents a sub-class number; R represents a corresponding value to be returned back in subsequent messages; Reserved represents a reservation field, in which a B (bidirectional) bit of 1 bit is provided, representing whether to enable the function of "bidirectional restoration." Other bits have respective meanings and functions in the prior art, for example, H bit represents a function for switching the connection between the control plane and management plane, L bit represents a lock function of connection management, I bit represents whether to inhibit alarm, and C represents whether to support a function of call management.

Figure 5:
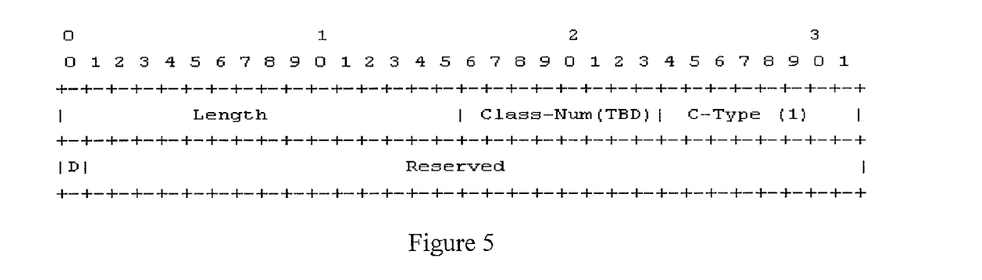
FIG. 5 is a schematic diagram illustrating structure of Setup object of a reverse signaling message, according to an embodiment of the invention.

Furthermore, a Setup object for indication of reverse signaling setup is also provided, in which D bit is set as 1.

As shown in FIG. 5, the contents of the Setup object structure includes: Length represents a length of object in bytes; Class-Num represents a class number; C-Type represents a sub-class number; Destination (D) represents whether to initiate a restoration path setup request from the end node; and Reserved represents a reservation field.

In this embodiment, a bidirectional restoration flag bit is provided, which may be mapped with the above activation of "bidirectional restoration function," i.e. each node determines that the current restoration path is established through the bidirectional restoration function when receiving this bidirectional restoration flag bit. By providing the Setup object in the reverse signaling message, the node in restoration path may identify the reverse signaling message using this extended object, so as to determine that the current restoration path setup request is initiated by the end node and the direction of subsequent path to be established, and the node in restoration path may also identify whether the termination point of the signaling is a source node of standard signaling.

In addition to providing some setup contents in the signaling message as described above, a connection Identification (ID) and Explicit Route Object (ERO) contained in the signaling message may also be set. As to the connection ID, forward and reverse signaling messages contain the same connection ID which indicates P1. As to the ERO, the sequence of nodes passed through during the establishment of a restoration path is set in both forward and reverse signaling message, the contents of which are the same. However, since a Setup object is provided in the reverse signaling message, executing of the ERO set in the reverse signaling message is opposite to that in the forward signaling message as affected by this extended object. As shown in FIG. 3, for the forward signaling message, the execution is as follows: node A→node C→node D→node F→node G→node I→node J, i.e., a restoration path is established from the first node (node A) to the end node (node J). For the reverse signaling message, the execution is as follows: node J→node I→node G→node F→node D→node C→node A, i.e. a restoration path is established from the end node (node J) to the first node (node A).

S104: the first node carrying the forward signaling message initiates the restoration path setup request in the direction toward the end node, while the end node carrying the reverse signaling message also initiates the restoration path setup request.

As shown in FIG. 3, the first node (node A) carrying the forward signaling message initiates the restoration path setup request in the direction from node A to node J to establish LSP P11, while the end node (node J) carrying the reverse signaling message initiates the restoration path setup request in the direction from node J to node A to establish LSP P12. It should be noted that P11 and P12 indicate the logical connection identification of the path, respectively, i.e. P11 refers to a restoration path connection established by the first node (node A), while P12 refers to a restoration path connection established by the end node (node J), the purpose of which is to distinguish the two connection logically, but in fact, they belong to the same restoration path, i.e. both the two signaling messages of P11 and P12 contain the same LSP Identification (ID).

S105: When receiving the restoration path setup request, the node starts detecting of signaling status information, including: detecting whether a restoration path setup request from the opposite end is received (signaling messages meet at a certain node), and whether a connection through the current node has been established in response to the restoration path setup request from the opposite end (signaling messages meet between two nodes); establishing a connection through the current node by performing corresponding processing depending on the detected different information, and storing the signaling message of the received restoration path setup request. A detailed description will be given in three cases.

Case 1: A restoration path setup request initiated by one of the first node and the end node is received by a node, and then a connection through the current node is established, according to the forward signaling message or the reverse signaling message.

Figure 6:
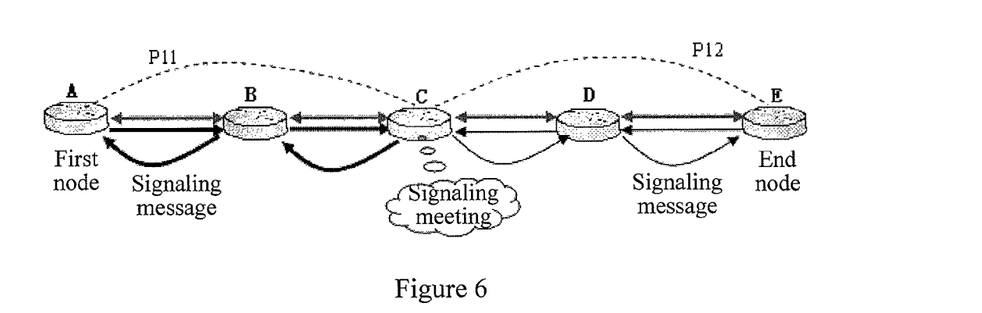
FIG. 6 is a schematic diagram illustrating the case that a forward signaling message and a reverse signaling message meet at a single node, according to an embodiment of the invention.

Case 2: Restoration path setup requests initiated by both the first node and the end node are received by a node, as shown in FIG. 6. The forward and reverse signaling message meet at node C, and some intermediate states may be generated. In the present invention, processing may be performed depending on the selected restoration mechanism, i.e. the resource reservation mode or resource pre-selection mode.

(1) Resource Reservation Mode

Node C selects path resources suitable for the current node to establish a path connection, according to the path resources set in the forward and reverse signaling messages and the path resources possessed by the current node. In other words, the node C makes a certain decision of local resources according to a tag object in the signaling messages, and then selects the tag in the two signaling messages.

(2) Resource Pre-Selection Mode

Since all resources about the P11 and P12 are selected, the connection in data plane may be implemented based on pre-selected path information without making a resource decision according to the tag object.

Case 3: Before receiving a restoration path setup request initiated by the first node or the end node, a node has already received a restoration path setup request initiated from the opposite end (initiated by the end node or the first node), and has established a connection through the current node according to the restoration path setup request from the opposite end (signaling messages meet between two nodes).

Figure 7:
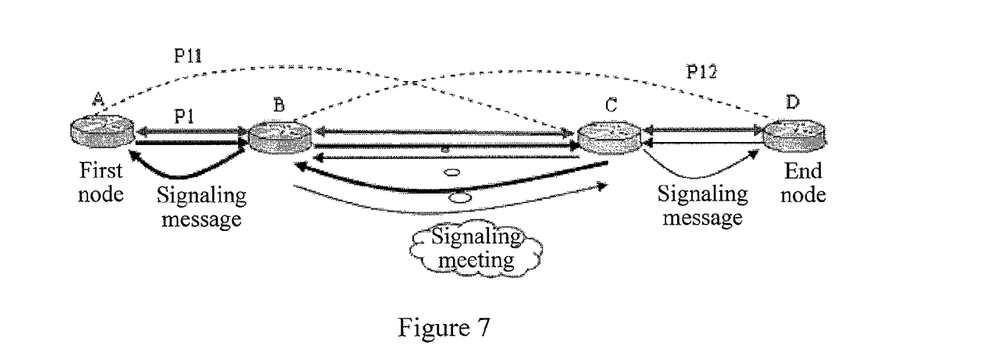
FIG. 7 is a schematic diagram illustrating the case that a forward signaling message and a reverse signaling message meet between two nodes, according to an embodiment of the invention.

As shown in FIG. 7, two signaling messages meet between node B and node C, i.e., node B has received a forward signaling message before receiving a reverse signaling message, and has established a connection through itself according to the forward signaling message, while node C has received the reverse signaling message before receiving the forward signaling message, and has established a connection through itself according to the reverse signaling message. Apparently, the forward and reverse signaling messages meet between the two nodes, and some intermediate states may be generated. In this case, processing is required to be performed depending on the selected restoration mechanism, i.e. the resource reservation mode or resource pre-selection mode.

(1) Resource Reservation Mode

Figure 8:
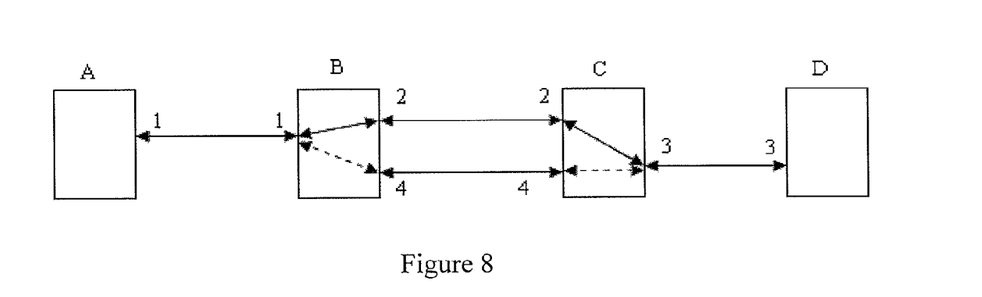
FIG. 8 is a schematic diagram illustrating the case that there is a collision in the path resources set by a forward signaling message and a reverse signaling message, according to an embodiment of the invention.

When a conflict of path resources set in the forward and reverse signaling messages occurs at node B and/or node C, since the resources are only reserved in these nodes, it is possible to make connection incorrectly when the two signaling messages implement path connection processing respectively at node B and node C. In this case, the forward signaling message initiated by the first node may be defined as a main signaling message which has a decision right for resource selection. As shown in FIG. 8, since there occurs a conflict between the route resource (solid line in node B and node C) set in the forward signaling message and the route resource (dashed line in node B and node C) set in the reverse signaling message, it is selected that a connection is established based on the forward signaling message. Therefore, the following processing is made.

a. For the node B, it receives the restoration path setup request containing forward signaling message earlier, then the established connection is reserved as a connection passed through currently whether a conflict occurs between the path resources set in the forward and reverse signaling messages or not, and path connection processing is unnecessary when the reverse signaling message arrives.

b. For the node C, if a conflict occurs between the path resources set in the forward and reverse signaling messages, the existing connection that has been established based on the reverse signaling message is disconnected at the node C, according to the above rule defining that the forward signaling message acts as the main signaling message, and then a path connection is reestablished, according to the tag object in the forward signaling message. If no conflict occurs, the established connection is reserved as a connection passed through currently and path connection processing is unnecessary when the forward signaling message arrives.

(2) Resource Pre-Selection Mode

Since all resources for the P1 are selected, and no conflict occurs between the path resources set in the forward and reverse signaling messages, the connection in data plane is implemented with reference to pre-selected path information without making resource decision, according to the tag object due to a misconnection.

S106: Upon receiving the forward and reverse signaling messages and accomplishing the establishment of connection through the node, the current node feeds back a setup request acknowledge message to the first node and the end node, respectively.

For the second case above, as shown in FIG. 6, the forward and reverse signaling messages meet at the node C, the node C feeds back a setup request acknowledge message, in the opposite directions, to the first node (node A) in the form of standard signaling and to the end node (node E) in the form of extended signaling, until the two setup request acknowledge messages arrive to the first node and the end node.

For the third case above, as shown in FIG. 7, the forward and reverse signaling messages meet between the node B and node C, the node C in the P11 feeds back reversely a setup request acknowledge message to the first node (node A) in the form of standard signaling, and the node B in the P12 feeds back reversely a setup request acknowledge message to the end node (node D) in the form of extended signaling, until the two setup request acknowledge messages arrive to the first node and the end node.

S107: The receiving of setup request acknowledge message by the first node and the end node indicates that the first node and the end node accomplish the establishment of connection, respectively, and the first node and the end node notifies the status to each other to determine that the entire restoration path is established. Then the service is switched from the failed working path to the restoration path to be restored.

As shown in FIG. 3, during the process for establishing the P11 and P12, if one or both of the P11 and P12 are failed to be established, the first node and the end node of P1 is notified to remove the established connection. And the first node recalculates the restoration path to obtain information about nodes the new restoration path passed through. Then, it proceeds to S103 for the establishment of subsequent paths.

Therefore, it is assumed that the time for establishing a restoration path by using the existing technical solution is T, then the time for establishing a restoration path by using the technical solution provided in the embodiment of the present invention is only t (T/2<t<T). By using the technical solution of the embodiment of the present invention, it is obvious that the process of path restoration may be accelerated remarkably, the required time is much less than that for establishing a path in the form of "unidirectional restoration," which improves the working efficiency and reliability, releases the service from severe restrains in the transmission process, and avoids the service interrupt to the maximum. In addition, the solution of the present invention has good applicability, and the restoration mechanisms applicable in the invention include the restoration path resource reservation and restoration path resource pre-selection.

The invention further provides a system for realizing service protection in an ASON to switch the service in an ASON from a working path to a restoration path quickly when a failure occurs in the working path.

Figure 9:
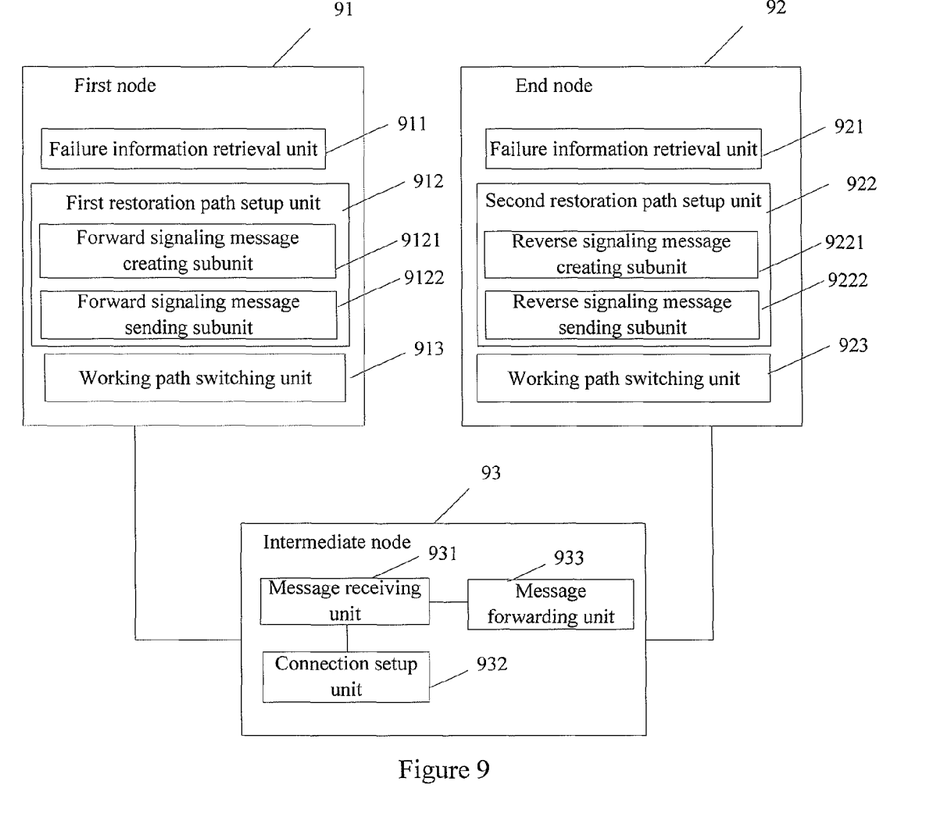
FIG. 9 is a block diagram illustrating principle of a system for implementing service protection in an ASON, according to an embodiment of the invention.

FIG. 9 is a block diagram illustrating principle of the system for realizing service protection in an ASON, according to an embodiment of the invention.

Referring to FIG. 9, in this embodiment of the invention, the system includes: a first node 91 and an end node 92 in the working path, an intermediate node 93 in a restoration path. Of course, in a practical system, there may be a plurality of nodes in the restoration path, although only one of them is shown in the diagram.

The first node 91 includes: a failure information obtaining unit 911, a first restoration path setup unit 912, and a working path switching unit 913. In particular, the failure information obtaining unit 911 is adapted to obtain information on failure in the working path; the first restoration path setup unit 912 is adapted to initiate a restoration path setup request in the direction toward the end node 92 along the restoration path; and the working path switching unit 913 is adapted to switch the service from the working path to this restoration path after the restoration path is established.

The end node 92 includes: a failure information obtaining unit 921, a second restoration path setup unit 922, and a working path switching unit 923. In particular, the failure information obtaining unit 921 is the same as the failure information obtaining unit 911 in the first node for obtaining information on failure in the working path, and the failure information obtaining unit 911 in the first node and the failure information obtaining unit 921 in the end node obtain the information on failure in the working path, respectively, from different nodes in the working path where the service is provided; the second restoration path setup unit 922 is adapted to initiate a restoration path setup request in the direction toward the first node 91 along the restoration path; and the working path switching unit 923 is the same as the working path switching unit 913 in the first node for switching the service from the working path to this restoration path after the restoration path is established To enable the intermediate node in the restoration path to identify whether the received restoration path setup request is from the first node or the end node, the first node may create a forward signaling message in the form of standard signaling, and the end node may create a reverse signaling message in the form of extended signaling. To this end, as shown in the figures:

The first restoration path setup unit 912 includes: a forward signaling message creating subunit 9121 and a forward signaling message sending subunit 9122. In particular, the forward signaling message creating subunit 9121 creates the forward signaling message in the form of standard signaling and a bidirectional restoration flag bit is provided in the forward signaling message; and the forward signaling message sending subunit 9122 carrying the forward signaling message initiates a restoration path setup request.

The second restoration path setup unit 922 includes: a reverse signaling message creating subunit 9221 and a reverse signaling message sending subunit 9222. In particular, the reverse signaling message creating subunit 9221 creates the reverse signaling message in the form of extended signaling and a bidirectional restoration flag bit and an extended object are provided in the reverse signaling message; and the reverse signaling message sending subunit 9222 carrying the reverse signaling message initiates a restoration path setup request.

The intermediate node 93 in the restoration path includes: a message receiving unit 931, a connection setup unit 932 and a message forwarding unit 933. In particular, the message receiving unit 931 is adapted to receive the restoration path setup request; the connection setup unit 932 is adapted to establish a connection, according to the restoration path setup request; and the message forwarding unit 933 is adapted to forward the restoration path setup request hop by hop, until the restoration path is established.

The process of implementing service protection by using the system provided in the invention may refer to the description of the method provided in the invention, and will not be described here in detail.

Figure 10:
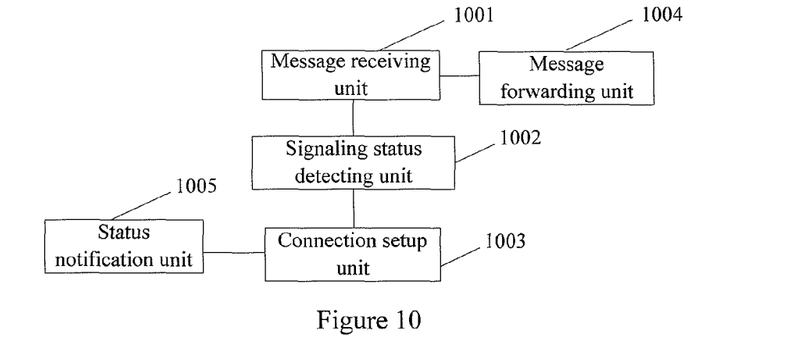
FIG. 10 is a block diagram illustrating principle of a node device in an ASON, according to an embodiment of the invention.

A block diagram illustrating principle of an intermediate node device in the restoration path applied to the system of an embodiment of the invention is shown in FIG. 10.

The node device in the embodiment includes:

a message receiving unit 1001, a signaling status detecting unit 1002, a connection setup unit 1003 and a message forwarding unit 1004, in particular, the message receiving unit 1001 is adapted to receive the restoration path setup requests initiated oppositely by the first node and the end node, respectively, in the working path; the signaling status detecting unit 1002 is adapted to detect signaling status information after the message receiving unit 1001 receives the restoration path setup request, and the signaling status information includes whether a restoration path setup request is received from the opposite node, and whether a connection through the current node has been established, according to the restoration path setup request from the opposite node; the connection setup unit 1003 is adapted to establish a connection according to the detection result from the signaling status detecting unit 1002; and the message forwarding unit 1004 is adapted to forward the restoration path setup request hop by hop, until the restoration path is established.

Since the first node and the end node initiate oppositely the restoration path setup requests, respectively, along the restoration path, the opposite two signaling messages may meet at a node or between two nodes; thus, the restoration path setup request may be received by the node in the restoration path in the following cases:

Case 1: A restoration path setup request initiated by one of the first node and the end node is received by a node.

Case 2: Restoration path setup requests initiated by both the first node and the end node are received by a node.

Case 3: Before receiving a restoration path setup request initiated by the first node or the end node, a node has already received a restoration path setup request initiated from the opposite end (initiated from the end node or the first node), and has established a connection through the current node, according to the restoration path setup request from the opposite end (signaling messages meet between two nodes).

For the purpose of ensuring a connection through the current node to be established under the above different cases, in the above three cases:

if the detection result from the signaling status detecting unit 1002 is that one of the restoration path setup request carrying the forward signaling message from the first node and the restoration path setup request carrying the reverse signaling message from the end node is received by the message receiving unit 1001, the connection setup unit 1003 establishes a connection through the current node; and if the detection result from the signaling status detecting unit 1002 is that both the forward signaling message and the reverse signaling message are received by the message receiving unit 1001, the connection setup unit 1003 establishes a connection through the current node based on the preset restoration mechanism.

The restoration mechanisms include resource pre-selection mode and resource reservation mode, and the detailed process of establishing a connection through the current node, according to the restoration mechanism may refer to the foregoing description of the method provided in the invention, and will not be described here in detail.

For the purpose that the first node and the end node may know the path connection establishment condition at the intermediate node in the restoration path, a status notification unit 1005 may be set in the current node device for feeding back the setup request acknowledge message to the first node and/or the end node after the message receiving unit 1001 receives the forward signaling message and the reverse signaling message and the connection setup unit 1003 establishes the connection through the current node, and for feeding back a path setup failure message to the first node and/or the end node when the connection setup unit 1003 is failed to establish a connection through the current node.

In this case, after receiving the setup request acknowledge message, the first node and the end node may notify the status to each other to confirm that the restoration path is established completely, and if the path setup failure message is received, the first node and/or the end node may notify the other nodes in the restoration path to remove the established restoration path connection.

While the present invention has been described with reference to one or more exemplary embodiments, the scope of the invention is not limited to these. Those skilled in the art will recognize that many changes may be made to the invention without departing from the spirit and scope of the present invention. Each of these embodiments and obvious variations thereof is appreciated to fall within the spirit and scope of the claimed invention, which is set forth in the following claims.

What is claimed is:

1. In an Automatically Switched Optical Network (ASON), in order to efficiently establish a restoration path to restore transmission of a service when a failure occurs in a working path for the service, a method for establishing a restoration path comprising:

receiving, by an intermediate node, from a node B of the working path for the service, a second restoration path setup request comprising a second Label Switch Path Identification (LSP ID) and a bidirectional restoration flag bit indicating that a node A and the node B of the working path both initiate a signaling message to establish the restoration path for the working path;

determining, by the intermediate node, that no connection has been established based on the restoration path setup request from the node B of the working path;

based upon the determination, establishing, by the intermediate node, a second connection according to the restoration path setup request received from the node B of the working path;

receiving, by the intermediate node, from the node A of the working path for the service, a first restoration path setup request comprising a first LSP ID indicating a same restoration path as the second LSP ID and the bidirectional restoration flag bit indicating that the node A and the node B of the working path both initiate the signaling message to establish the restoration path for the working path;

determining, by the intermediate node, that the second restoration path setup request from the node B of the working path has been received;

determining, by the intermediate node, that a second connection has been established based on the restoration path setup request from the node B of the working path;

determining, by the intermediate node, that the first restoration path setup request from the node A of the working path is provided with a decision right;

based upon the determinations, disconnecting, by the intermediate node, the connection which is established according to the second restoration path setup request received from the node B of the working path;

establishing, by the intermediate node, a first connection according to the first restoration path setup request received from the node A of the working path; and sending, by the intermediate node, a setup request acknowledge message to the node A to notify the node A that the first connection has been established.

2. The method according to claim 1, wherein before the step of receiving the second restoration path setup request from the node B of the working path for the service, the method further comprises: configuring the service on user demand and activating a bidirectional restoration function in the node A and the node B in the working path.

3. The method according to claim 1, wherein an extended object is added in the first restoration path setup request from the node A or the second restoration path setup request from the node B of the working path for identifying the direction of transmission of the restoration path setup request.

4. The method according to claim 1, further comprising:
determining, by the intermediate node, that the node A or B of the working path fails to establish the restoration path;
sending, by the intermediate node, a failure message to the node A and B of the working path; and
removing, by the intermediate node, the established restoration path.

5. In an Automatically Switched Optical Network (ASON), in order to efficiently establish a restoration path to restore transmission of a service when a failure occurs in a working path for the service, a system for establishing a restoration path comprising:

a node A;
a node B in the working path; and
at least one intermediate node in the restoration path,
wherein the node A comprises: a restoration path setup unit adapted to create a first restoration path setup request comprising a first Label Switch Path Identification (LSP ID) and a bidirectional restoration flag bit indicating that the node A and the node B of the working path both initiate a signaling message to establish the restoration path for the working path;
wherein the node B comprises: a restoration path setup unit adapted to create a second restoration path setup request comprising a second LSP ID indicating a same restoration path as the first LSP ID and the bidirectional restoration flag bit indicating that the node A and the node B of the working path both initiate the signaling message to establish the restoration path for the working path; and
wherein the at least one intermediate node in the restoration path comprises:
a message receiving unit adapted to receive the first and second restoration path setup requests from the node A and the node B;
a connection setup unit adapted to:
determine that no connection has been established based on the second restoration path setup request from the node B of the working path;
based upon the determination, establish a second connection according to the second restoration path setup request received from the node B of the working path;
determine that the second restoration path setup request from the node B of the working path has been received;

determine that a second connection has been established based on the second restoration path setup request from the node B of the working path;
determine that the first restoration path setup request from the node A of the working path is provided with a decision right;
disconnect based upon the determinations the second connection which is established according to the second restoration path setup request received from the node B of the working path;
establish a first connection according to the first restoration path setup request received from the node A of the working path; and
send a setup request acknowledge message to the node A to notify the node A that the first connection established according to the first restoration path setup request received from the node A has been established.

6. A non-transitory computer readable medium having stored therein computer executable instructions, which, when executed in a computing device in an intermediate node, execute the following steps:

receiving, from a node B of the working path for a service, a second restoration path setup request comprising a second Label Switch Path Identification (LSP ID) and a bidirectional restoration flag bit indicating that a node A and the node B of the working path both initiate a signaling message to establish the restoration path for the working path;

determining that no connection has been established based on the second restoration path setup request from the node B of the working path;

based upon the determination, establishing a second connection according to the second restoration path setup request received from the node B of the working path;

receiving, from the node A of the working path for the service, a first restoration path setup request comprising a first LSP ID indicating a same restoration path as the first LSP ID and a bidirectional restoration flag bit indicating that the node A and the node B of the working path both initiate the signaling message to establish the restoration path for the working path;

determining that the second restoration path setup request from the node B of the working path has been received;

determining that a second connection has been established based on the second restoration path setup request from the node B of the working path;

determining that the first restoration path setup request from the node A of the working path is provided with a decision right;

based upon the determinations, disconnecting the second connection which is established according to the second restoration path setup request received from the node B of the working path;

establishing a first connection according to the first restoration path setup request received from the node A of the working path; and sending a setup request acknowledge message to the node A to notify the node A that the first connection established according to the first restoration path setup request received from the node A has been established.

7. The non-transitory computer readable medium according to claim 6, wherein the non-transitory computer readable medium is selected from one or more from the group: Read-Only Memory (ROM); Programmable Read-Only Memory (PROM); Erasable PROM (EPROM); Flash memory; Electrically Erasable PROM (EEPROM); and hard disk drive.

8. The method according to claim 1, wherein the node A is a first node of the working path and the node B is an end node of the working path, or, the node A is an end node of the working path and the node B is a first node of the working path.

* * * * *